US006420641B1

(12) United States Patent
Kuan

(10) Patent No.: US 6,420,641 B1

(45) Date of Patent: Jul. 16, 2002

(54) MULTIMEDIA KEYBOARD WITH INSTRUMENT PLAYING DEVICE

(75) Inventor: Yen-Liang Kuan, Jia Yi (TW)

(73) Assignee: Behavior Tech Computer Corp., Taipei (TW)

(*) Notice: Subject to any disclaimer, the term of this patent is extended or adjusted under 35 U.S.C. 154(b) by 0 days.

(21) Appl. No.: 09/899,145

(22) Filed: Jul. 6, 2001

(51) Int. Cl.$^7$ .............................. G01P 3/00; G10H 5/00

(52) U.S. Cl. ............................ 84/658; 84/687; 84/719; 84/744; 84/423 R

(58) Field of Search .......................... 84/600, 658, 687, 84/718–720, 723, 743–745, 423 R, 424, 439

(56) References Cited

U.S. PATENT DOCUMENTS 5,646,648 A * 7/1997 Bertram .................... 84/423 R
5,971,635 A * 10/1999 Wise ........................... 84/744
6,063,994 A * 5/2000 Kew et al. .................... 84/600
6,351,225 B1 * 2/2002 Moreno ....................... 84/744

* cited by examiner

*Primary Examiner*—Marlon T. Fletcher
(74) *Attorney, Agent, or Firm*—Rosenberg, Klein & Lee

(57) ABSTRACT

A multimedia keyboard with instrument playing device comprising a case, a connector and flexible protruding plate mounted on one end of the case. A protruding plate can be inserted into an available slot in the multimedia keyboard, providing a signal connection and a flexible clip. Playing elements such as guitar strings, piano keys, or a drumhead are mounted on the exterior of the case. Several series of flexible conducting elements connected to the playing elements are mounted within the case. When the playing elements are struck or plucked, the conducting elements will deform in direct proportion to the amount of force that has been applied. One signal pickup circuit board including several carbon film resistance plates is mounted on the top or bottom of each flexible conducting elements. When a flexible conducting elements deforms, the changing area of contact between its deformed portion and the carbon film resistance plates can be used to generate analog signals in direct proportion to the amount of force applied to the playing elements. These signals allow the computer to generate sound length, tone, and volume corresponding to those of the playing elements.

11 Claims, 3 Drawing Sheets

MULTIMEDIA KEYBOARD WITH INSTRUMENT PLAYING DEVICE

FIELD OF THE INVENTION

The present invention relates to a multimedia keyboard with instrument playing device, in particular to a simulated instrument playing device for use with multimedia keyboards.

BACKGROUND OF THE INVENTION

Multimedia keyboards widely use the graphics and sound effects input control functions of PCs. In particular, the rapid development of PC music simulation software and program technology has enabled the functionality of multimedia keyboards to transcend the control of graphics and sound effects. For instance, music or sound effects production programs provide instrument-playing functions for such instruments as guitar, piano, and drums. Nevertheless, operation of such playing components as guitar strings, piano keys and drumhead must be simulated by pressing the alphanumeric keys of the multimedia keyboard. In addition, the volume and tone can be adjusted only by pressing various function keys. This approach makes operation complex and inconvenient. Besides making operation difficult, because it cannot give users the feeling of actually playing an instrument, the approach tends to result in poor performance.

SUMMARY OF THE INVENTION

The main objective of the present invention is to provide a multimedia keyboard with instrument playing device to generate analog electrical signals corresponding to the force applied to the instrument during play, so that a PC can produce lifelike simulated playing effects with accurate sound length, tone, and volume.

A further objective of the invention is to provide a multimedia keyboard with instrument playing device so that the playing of instruments does not require the simultaneous use of any keyboard keys. Playing is thus as simple, convenient, and immediate as playing an actual instrument.

According to the invention, the multimedia keyboard with instrument playing device comprises a case, on one end of which is mounted a signal connector and flexible protruding plate. The protruding plate can be inserted into an available slot in a multimedia keyboard, providing a signal connection and a flexible clip. Playing elements such as guitar strings, piano keys, or a drumhead are mounted on the exterior of the case. Several series of flexible conducting elements connected to the above-mentioned playing elements are mounted within the case. When the playing elements are struck or plucked, the conducting elements will deform in direct proportion to the amount of force that has been applied. One signal pickup circuit board including several carbon film resistance plates is mounted on the top or bottom of each flexible conducting elements. When a flexible conducting elements deforms, the changing area of contact between its deformed portion and the carbon film resistance plates can be used to generate analog signals in direct proportion to the amount of force applied to the playing elements. These signals enable the computer to generate sound length, tone, and volume corresponding to those of the playing elements, and thus allow a PC to reproduce the actual sounds of instrument playing.

Figure 1:
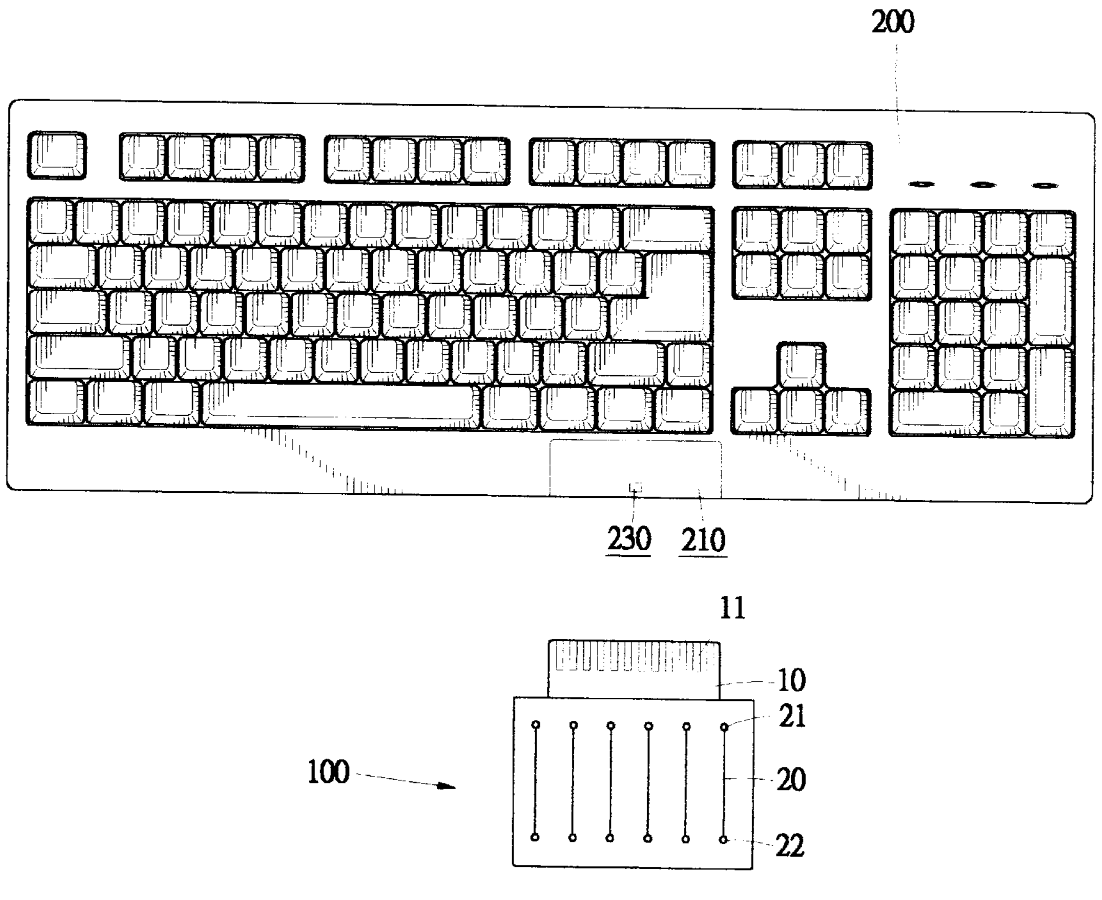
FIG. 1 is a perspective view of the first embodiment of the invention.
Figure 2:
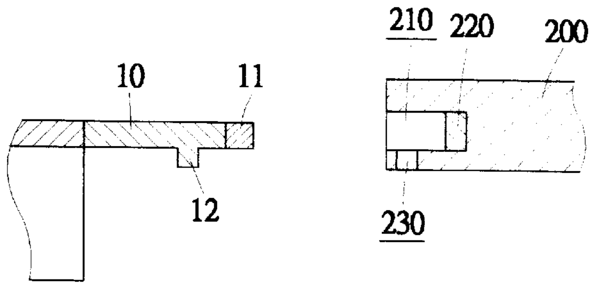
FIG. 2 is a cross sectional view of the case and multimedia keyboard slot.
Figure 3:
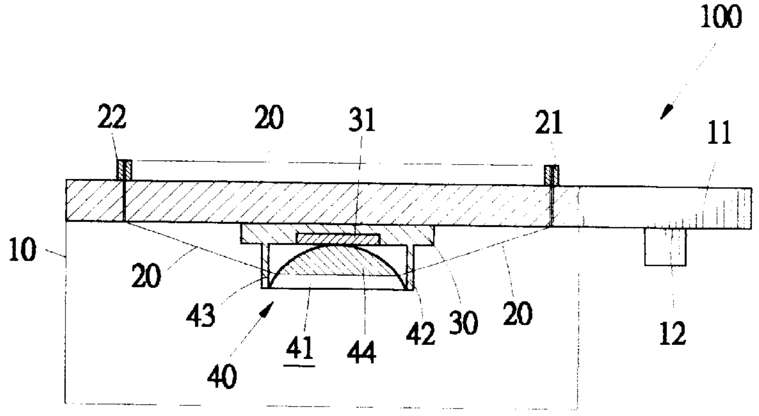
FIG. 3 is a cross sectional view showing the connected structure of guitar string playing elements and flexible conducting elements.
Figure 4:
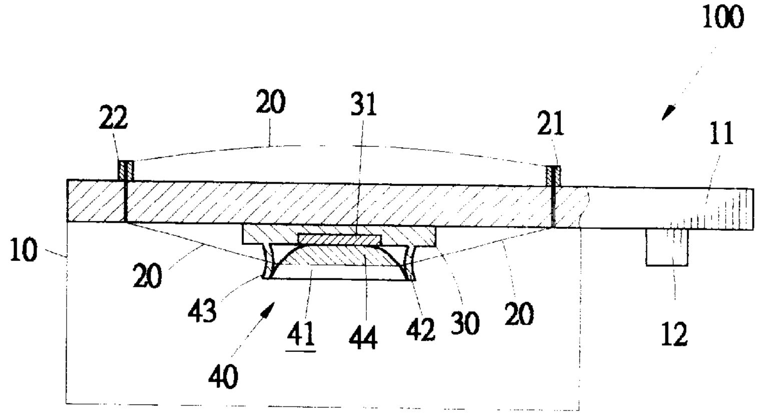
FIG. 4 is a cross sectional view similar to FIG. 3, showing how the flexible conducting elements are compressed and deform when the guitar string playing elements are plucked.

Please refer to FIGS. 1~3, a multimedia keyboard instrument playing device of the invention, henceforth referred to as instrument playing device, is indicated by 100 in all figures. The instrument playing device 100 comprising a case 10 of any shape or form. The case 10 is in the form of a small box in the first rembodiment, and in this form simulates a guitar. It may be inserted in a slot 210 in a multimedia keyboard 200, and a connector 220 and an opening 230 are mounted within slot 210. A signal connector 11 and a flexible protruding plate 12 (see FIG. 2) are mounted on one end of the case 10. When the case 10 is inserted into the slot 210, the signal connector 11 and a flexible protruding plate 12 respectively connect with and fasten into connector 220 and opening 230, allowing electrical signals to pass between the instrument playing device 100 and the multimedia keyboard 200. At the same time, the case 10 can be securely connected to the multimedia keyboard 200.

Several series of playing elements 20 of any form are mounted on the exterior of the case 10. While the embodiment shown in FIGS. 1~3 comprises guitar strings. Other playing components such as piano keys or drumheads are also included within the asserted scope of this invention. Because each of the playing element 20 is in the form of a guitar string, fastening rings 21 and 22 are mounted at the end of each string. The fastening rings 21 and 22 allow the playing element 20 to pass through the case 10 and stretch to the outside, allowing flexible expansion. One signal pickup circuit board 30 is mounted within the case 10 in each position corresponding to the playing element 20. Several flexible conducting elements 40 are mounted on the surface of the signal pickup circuit board 30. The conducting elements 40 may be of any form, but must return to their original shape after deformation. While conducting rubber is used in the embodiments of this invention, other equally-effective elements are also included within the scope of this invention.

A groove 41 is installed on one end of each flexible conducting element 40 and provides a connection for the playing element 20 (see FIG. 3). Whenever the playing element 20 is plucked or struck, generating compressive force, this causes flexible conducting elements 40 to compress and deform in direct proportion to the strength of the applied force in the direction of the signal pickup circuit board 30. The number of the flexible conducting elements 40 connected to each playing element 20 is not restricted. Because the playing elements 20 are guitar strings, the tone can be controlled by pressing the playing elements 20 down at different places. The flexible conducting elements 40 are mounted at one end of the signal pickup circuit board 30 and connected with the signal pickup circuit board 30 by means of pegs 42 and 43. A contact area 44 is mounted on the same end of the signal pickup circuit board 30, and serves to make contact with the surface of the signal pickup circuit board 30.

Several series of carbon film resistance plates 31 of any form are mounted on the surface of the signal pickup circuit 30. The carbon film resistance plates 31 are elongated printed carbon film resistors in the preferred embodiment of this invention. The carbon film resistance plates 31 respectively make contact the contact areas 44 of the flexible conducting elements 40. When the playing elements 20 have not been moved, the area of contact between the hemispheric contact areas 44 and the carbon film resistance plates 31 is at a minimum, and is only a small point (see FIG. 3). At this time the electric current flowing through the carbon film resistance plates 31 or the circuit connected with them will be at a minimum. We have defined this as the initial, undisturbed state.

Please refer to FIGS. 1~4, the operation of the instrument playing device 100 of the invention comprises the plucking of the playing elements 20, which are played in the manner of normal guitar strings. Plucking of the playing elements 20 causes the flexible conducting elements 40 corresponding to and attached to the playing elements 20 to deform in a manner that is completely in proportion to the amount of applied plucking force. The deformation of the flexible conducting elements 40 thus reflects the intensity of the plucking of the guitar strings and controls the volume. The amount of deformation of each flexible conducting elements 40 will be slightly different depending on where the user's finger presses down on playing element 20, which serves to control tone in the same way that the position of a player's fingers pressing on guitar strings controls the tone. The deformation of the flexible conducting elements 40 causes the area of contact between the carbon film resistance plates 31 on the signal pickup circuit 30 and the contact areas 44 of the flexible conducting elements 40 to vary, and the area will invariably be larger than the original area of contact.

Figure 5:
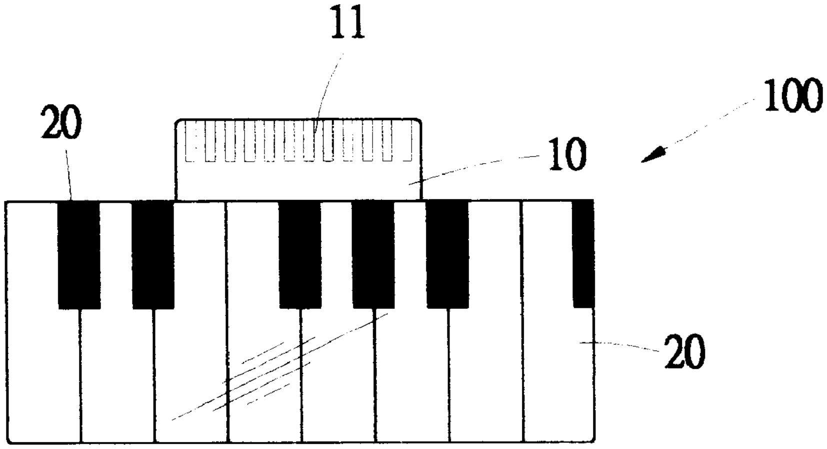
FIG. 5 shows a second embodiment of the invention.
Figure 6:
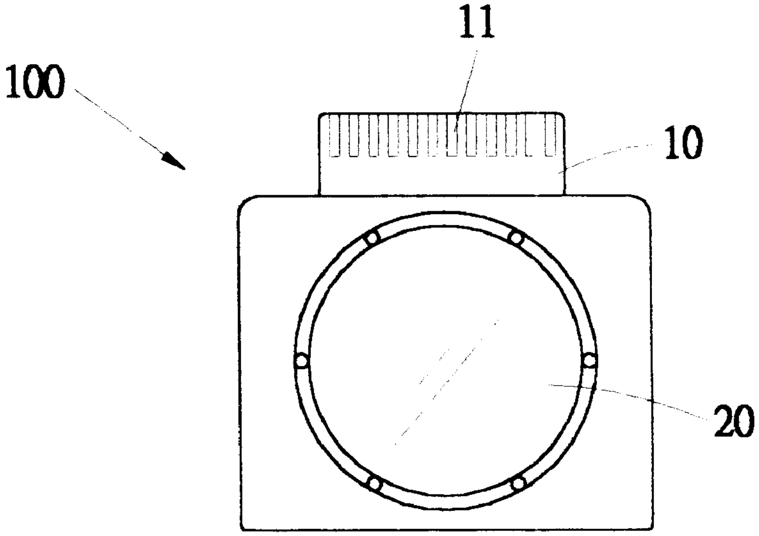
FIG. 6 shows a third embodiment of the invention.

FIGS. 5 and 6 show second and third embodiments of the instrument playing device 100 of the invention, which respectively apply the invention to piano keys and drumheads. When the playing elements 20 are changed to piano keys or drumheads, the flexible conducting elements 40 are similarly mounted below the playing elements 20, allowing them to directly respond to the actual force applied to the playing elements 20 via pressing or striking action. Linear variations in the resistance or electrical signals generated by the carbon film resistance plates 31 in response to the deformation of the flexible conducting elements 40 reflect the actual state of play and the sound length, tone, and volume. A sound effects program on a PC can accurately process and play the resulting signal, giving the user a feeling of immediacy and allowing the simple and convenient editing and playing of instrumental sound effects.

What is claimed is:

1. A multimedia keyboard with an instrument playing device used for instrument playing in conjunction with said multimedia keyboard, the instrument playing device comprising a case, a signal connector mounted on one end of the case, the signal connector inserted into a slot formed on the multimedia keyboard, the signal connector joins with a connector on the multimedia keyboard and allows the transmission of electrical signals, several series of playing elements mounted on the exterior of the case to serve as simulated instrument playing components, a signal pickup circuit board mounted within the case, and one surface of the signal pickup circuit board having mounted thereon several carbon film resistance plates, several flexible conducting elements connected that the carbon film resistance plates to return to their original shape, one end of each flexible conducting element contacting with the surface of the carbon film resistance plate.

2. A multimedia keyboard with instrument playing device as claimed in claim 1, wherein the flexible protruding plate is mounted on the case and an opening forms a slot in the multimedia keyboard to allow the case to be inserted into the multimedia keyboard and be joined as a single unit.

3. A multimedia keyboard with instrument playing device as claimed in claim 1, wherein the playing element comprises guitar strings.

4. A multimedia keyboard with instrument playing device as claimed in claim 1, wherein a plurality of the fastening rings are attached to the two ends of the playing elements.

5. A multimedia keyboard with instrument playing device as claimed in claim 1, wherein the playing element comprises piano keys.

6. A multimedia keyboard with instrument playing device as claimed in claim 1, wherein the playing element comprises a drumhead.

7. A multimedia keyboard with instrument playing device as claimed in claim 1, wherein a groove is installed in one end of the flexible conducting elements to enable connection with the playing elements.

8. A multimedia keyboard with instrument playing device as claimed in claim 1, wherein a plurity of the contact areas are mounted formed on the signal pickup circuit board.

9. A multimedia keyboard with instrument playing device as claimed in claim 8, wherein the contact areas are hemispherical in shape.

10. A multimedia keyboard with instrument playing device as claimed in claim 1, wherein the flexible conducting elements are connected to the signal pickup circuit board by a pair of fastening pegs.

11. A multimedia keyboard with instrument playing device as claimed in claim 1, wherein the flexible conducting elements are made of conducting rubber.

* * * * *